Figure 1:
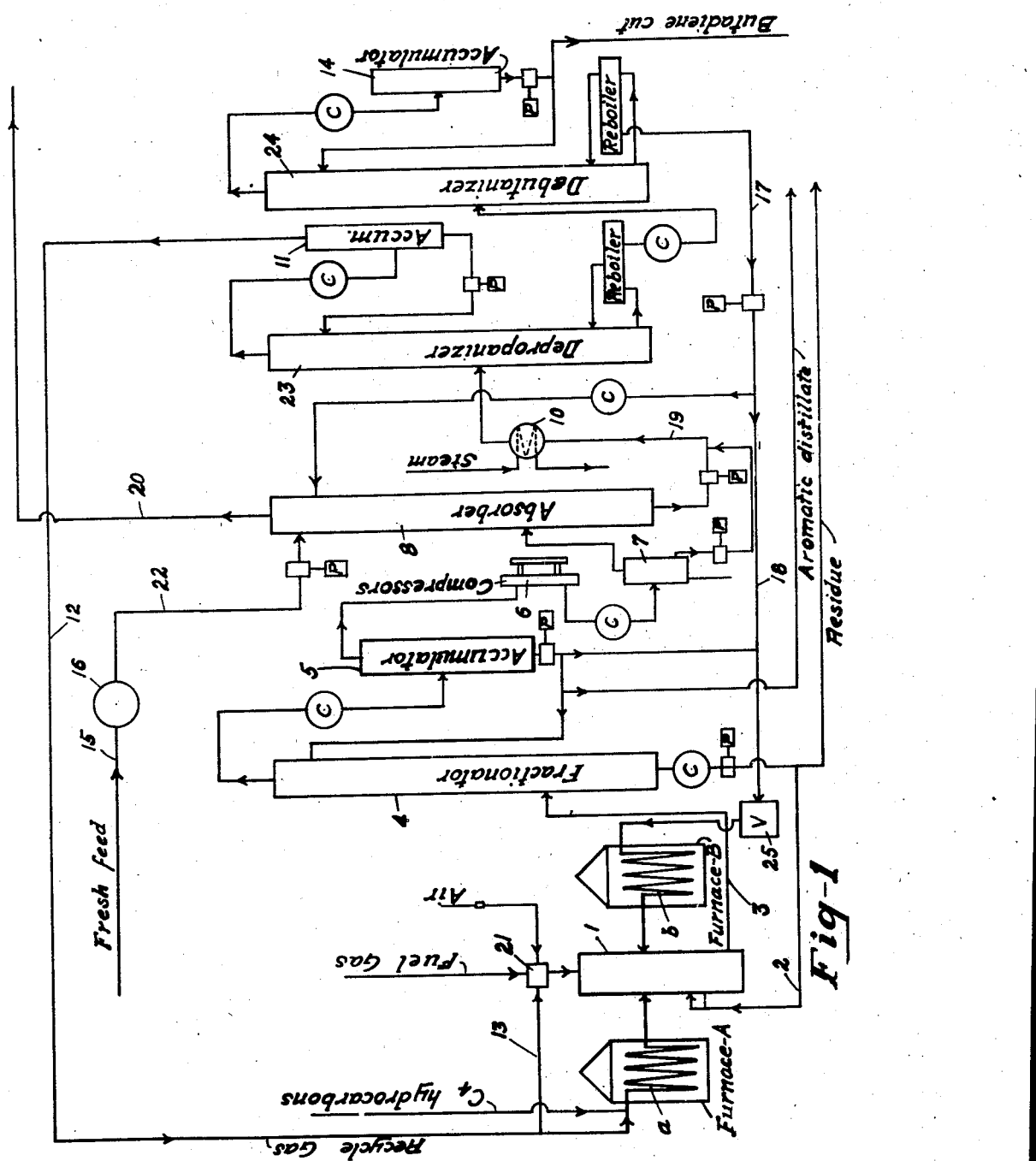

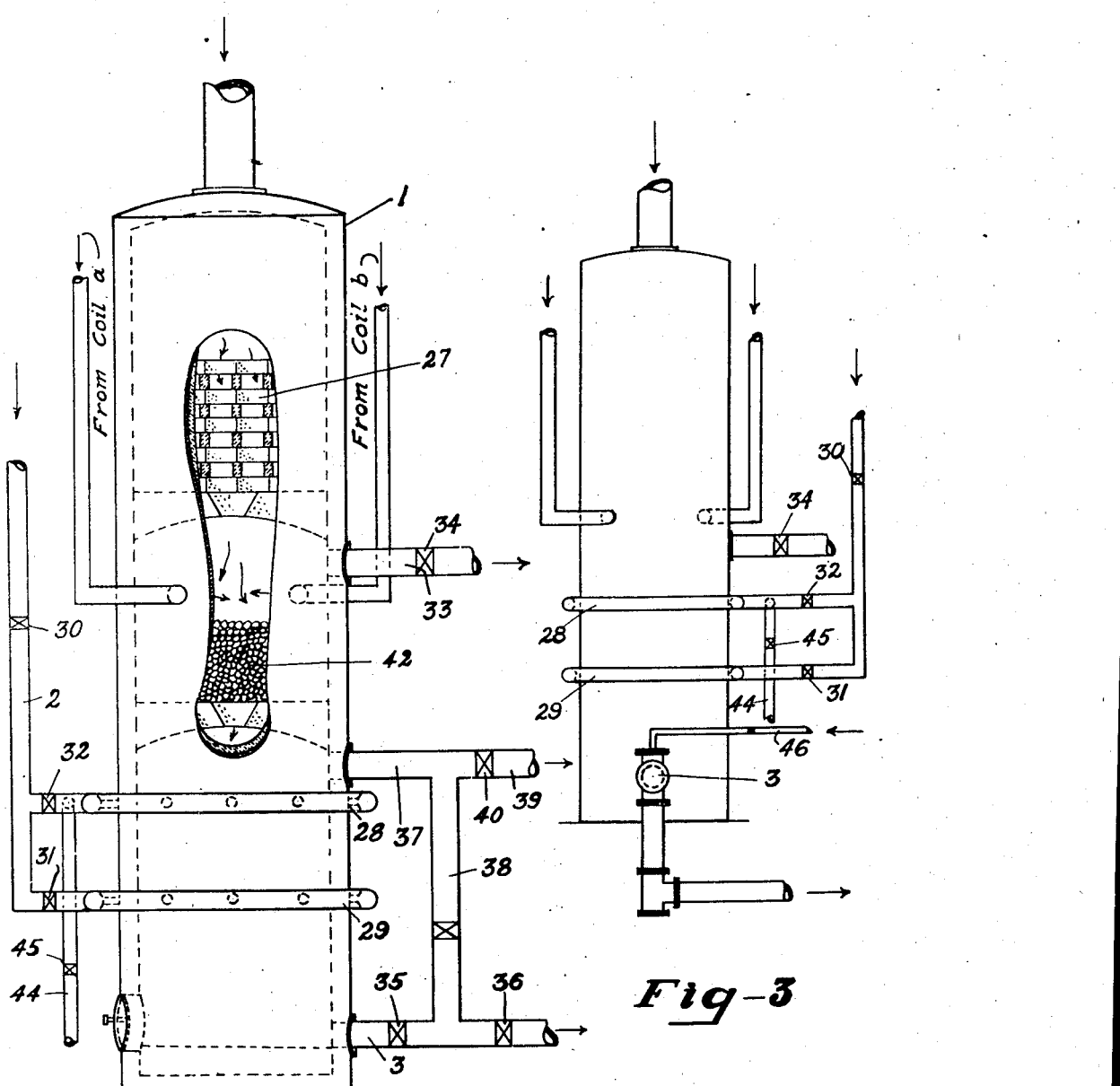

Patented Dec. 3, 1946

2,412,096

UNITED STATES PATENT OFFICE 2,412,096

PROCESS FOR TREATING HYDROCARBONS

William W. Odell, El Dorado, Ark., assignor to Lion Oil Company, a corporation of Delaware Application January 22, 1943, Serial No. 473,192

4 Claims. (Cl. 260—666)

My invention relates to an apparatus and process for treating hydrocarbons. In particular it deals with thermal reactions whereby hydrocarbons of relatively high molecular weight yield products of relatively low molecular weight and includes cracking. More specifically the invention has to do with the production of unsaturated hydrocarbons and aromatic hydrocarbons from petroleum products such as naphthas, kerosene, gasoline, fractions comprising chiefly a single hydrocarbon which may be saturated or unsaturated. The novelty of the invention relates to means and method whereby particular products such as olefins, diolefins, and certain aromatic hydrocarbons can be effectively produced without an excessive evolution of hydrogen and/or carbon; it also relates to the economy of materials of construction.

One of the objects of this invention is the production of butadiene economically. Other objects will become apparent from the disclosures made herein.

In attempting to duplicate the results reported by numerous investigators, who presented results of laboratory studies, I find that because of the difference in ratios of pipe surface to pipe volume for different sizes of pipe the results obtained in small tubes can not be duplicated in large tubes because of the impossibility of duplicating with large tubes the conditions existing when cracking hydrocarbons in small-size tubes. For example, the ratio of outer surface area to volume capacity of a unit length of ¼-inch pipe is approximately 40 to 1, whereas that of a 1½-inch pipe is approximately 4 to 1. Therefore the vapors can not be heated so quickly in a large tube at temperatures which are attainable and which metals will withstand, as in very small tubes such as are commonly used in the laboratory. I find that, in the production of butadiene from petroleum naphtha, the optimum amount of time that naphtha vapors are in a ¼-inch pipe at approximately 725° C. is about one tenth of a second whereas with pipe 2 inches in diameter it takes much more pipe and the vapors are thus confined during the heating stage for a number of seconds in order to reach the desired temperature; under these conditions considerable cracking occurs with the production of large volumes of hydrogen and methane which must be cooled, compressed and fractionally separated from the more valuable products. The amount of this cracking is of the order of fifty percent of the naphtha being processed. I find that tubes of moderately large size can be used effectively if proper conditions are provided to remedy the defects enumerated.

For any particular hydrocarbon there is a definite temperature above which it can not be confined in contact with iron for an appreciable period of time without dissociation or cracking occurring. In my process the hydrocarbon treated is heated in tubes to a temperature somewhat below this limit and the final desired boost in temperature is caused to occur suddenly by direct contact with hotter gases in a refractory lined chamber and the mixture is immediately cooled. In this manner the vapors of the hydrocarbon being treated are heated to the desired or optimum temperature for the production of butadiene, employing controlled brief time of exposure of the vapors to the action of high temperature while the life of the tubes or pipes in which the said vapors are initially heated is conserved. The gases produced in the process are used in the process but I find that they must be used in a definite manner in order to produce the desired results, which I believe to be new.

A "hook-up" or flow diagram is shown in Figure 1 which depicts one procedure for practicing my invention. Figure 2 shows in somewhat greater detail and in elevation, but diagrammatically, the reaction chamber in which the hydrocarbon being processed attains its maximum temperature; a portion of the outer casing is cut away to show the interior in section.

In Figure 1, the furnaces A and B are suitably connected with a supply of fuel and air for heating the coils $a$ and $b$ which coils confine flowing vapor streams; the vapors of the hydrocarbon to be processed pass through coil $b$ and a portion of the gas evolved in the process passes through coil $a$. The two streams of hot aeriform fluids meet in reaction chamber 1 which chamber functions both as a gas mixing and reaction chamber and a quenching chamber; the upper portion of 1 is a combustion chamber for incompletely burning a portion of some of the gas evolved in the process. The quenching fluid is the heavy ends or residue from the lower portion of fractionator 4 which is pumped through conduit 2 to chamber 1, any excess of this residue above that required as a quenching medium is discharged through the residue conduit. The reaction products formed in the reaction chamber 1, along with the vaporized quench fluid, passes out adjacent the bottom of 1, through conduit 3 to fractionator 4, whereas the fixed gas and light hydrocarbons pass out at the top of fractionator 4 through a cooler and conduit to accumulator 5; the "bottoms" or residue from accumulator 5 is divided into streams, one portion being used as a reflux in fractionator 4, another portion being introduced into the naphtha conduit 18, and the remainder passing out through the aromatic distillate conduit. Gases and vapors removed from the top of accumulator 5 are conducted to compressors 6 in which they are compressed to a suitable high pressure commonly in the neighborhood of 200 pounds per square inch gage pressure, the compressed gases are then cooled and conducted to accumulator 7. Water is drawn off from the bottom of accumulator 7 substantially as fast as it is collected. The liquid hydrocarbons collecting in accumulator 7 are withdrawn and pumped to a higher pressure approximating 300 pounds per square inch gage pressure and discharged into conduit 19; the vapors and gases discharged from the top of accumulator 7 pass into absorber 8 from which the high-boiling fraction is withdrawn at the bottom and pumped into conduit 19 with the high-boiling fraction from accumulator 7. The lean fixed gases pass out of accumulator 8 through conduit 20 and are used for fuel purposes. Fresh feed stock, for example petroleum naphtha, is caused to pass through conduit 15 to sulphur removal apparatus 16 from which it is discharged into conduit 22 pumped to a suitable pressure, commonly about 200 pounds per square inch gage pressure, and discharged into the upper portion of absorber 8 functioning therein as an absorber oil. The fluids in conduit 19 are passed through chamber 10 wherein they are heated and the heated fluid is conducted to the depropanizer 23. The vapors from the top of 23 are cooled and conducted into accumulator 11, the high-boiling fraction from the accumulator 11 is discharged back into the depropanizer as a refluxing medium whereas the gaseous fraction is discharged at the top of accumulator 11 into conduit 12 which conducts the major portion, approximately ninety per cent of it, to the pipe coil $a$ in furnace A, the remaining ten per cent being conducted through conduit 13 and gas-air mixing chamber 21 wherein it is mixed with somewhat less air than enough for its complete combustion; the gas-air mixture from 21 is discharged into the combustion chamber of 1. The high-boiling fraction from the depropanizer 23 discharging from the bottom thereof is cooled and passed into the debutanizer 24, from which the vapor fraction is removed at substantially the top thereof, cooled, and conducted to accumulator 14. A portion of the condensate accumulating in 14 is recirculated as a refluxing medium to the upper portion of debutanizer 24, the remainder being discharged as a butadiene cut in this example, from which butadiene is recovered. The high-boiling fraction from the lower portion of the debutanizer is discharged into conduit 17 from which a portion is recirculated, after cooling, to the upper portion of absorber 8, the remainder passing into conduit 18 from which it is discharged into vaporizer 25; the vapors from 25 are conducted directly into coil $b$ of furnace B.

In Figures 2 and 3 the same system of numbering is employed with additional numbers as follows: checker brick contact material for promoting combustion of the gas supplied at the top of reaction chamber 1 is shown at 27; bustle pipes 28 and 29 are employed for admitting the quenching fluid and they are so connected that either one can be employed alone or both used together by the proper control of valves 31 and 32; the main supply of quenching fluid is controlled by valve 30. An offtake 33 with control valve 34 is provided for use chiefly in starting operations, that is, hot products of combustion may be removed through 33 and 34 when the initial heating operation is under way; valve 34 is normally closed during the operation of the process producing butadiene. Figure 3 shows in outline an alternate method of discharging and quenching hot vapors from reaction chamber 1, 46 being an auxiliary quench-fluid conduit.

In the production of butadiene, practising my invention with equipment substantially as indicated in Figure 1, and employing naphtha distilling in the range 190° to substantially 400° F., I find that there are certain steps which must be carefully adjusted in order to produce the desired results and obtain the maximum yield of butadiene. Referring to Figure 1, when the fresh feed, namely petroleum naphtha, contains an appreciable amount of sulphur and the sulphur is not removed before entering the system, sulphur gases are formed which are carried into the system chiefly through conduit 17 and conduit 18, vaporizer 25, and coil $b$, although some sulphur gases are carried into the system through the gas conduits 12 and 13. When such a naphtha is used the quenching fluid in fractionator 4 becomes acid and has a deleterious effect on results which seem to be caused by the tendency of the acids formed from the sulphur gases to promote polymerization. The effect of this is manifest by a decrease in the yield of recoverable butadiene, gumming of the valves in compressor 6, and the deposition of solid matter of a carbonaceous nature in the lower portion of reaction chamber 1. For the purpose of eliminating these tendencies it is necessary to treat the supply of naphtha used in this process for the removal of sulphur compounds; sulphur removing equipment is indicated at 16. I find that when the air and gas supplied to the combustion chamber of reaction chamber 1 are not carefully mixed and in proportions whereby the air is less than sufficient for the complete combustion of the gas there is a tendency for nitric oxide to form as one of the products of combustion; when this condition exists the nitric oxide in the presence of moisture and some oxygen forms acid which is not only catalytic to the formation of polymers and gummy matter from unsaturated hydrocarbons but it also combines directly with unsaturated hydrocarbons. Here again gummy matter deposits on the valves in compressor 6 in operation. In order to avoid this condition I employ less air than is required for the complete combustion of the gas in the gas-air mixture supplied to mixing chamber 21 and to the reaction chamber 1; under these conditions there is no detectable amount of nitric oxide in the products of combustion. The amount of gas recirculated through conduit 13 and employed for combustion in the combustion chamber of reaction chamber 1 is a rather definite amount relative to the amount of naphtha processed. If an excess is used a large amount of gaseous products must be cooled and compressed, which in turn calls for more equipment including compressors, and the yield of butadiene decreases. If too little gas is burned in the combustion chamber of 1, the optimum temperature is not attained in the reaction zone of chamber 1 and again the butadiene recovery is decreased. Although this optimum amount of gas to be burned is not exactly the same for all raw materials processed, I find that in treating naphtha as in this example the amount of gas burned in the combustion chamber of 1 for obtaining the optimum yield of butadiene is that amount which is equivalent to less than ten per cent of the heat of combustion of said naphtha; I have been able to obtain said results with an amount of gas equivalent in heating value to approximately 1.5 per cent of the heat of combustion of the naphtha.

Natural gas or other combustible gas which is substantially free from sulphur compounds can be used as the fuel gas supplied to mixing chamber 21 of Figure 1, but it should not contain a large percentage of inert matter. Gas containing hydrogen is particularly satisfactory because of the formation of water vapor by its combustion. It will be noted that in using gas from accumulator 11 through conduits 12 and 13 as fuel gas supplied to mixing chamber 21 said fuel gas is substantially free from nitrogen, carbon monoxide, and carbon dioxide which latter gases are removed from the system through offtake 20 from absorber 8. Steam may be introduced along with the fuel gas admitted to mixing chamber 21 but I find that it is more satisfactory to introduce this steam in the recycle gas supplied to pipe coil $a$ for two reasons, namely, to avoid the delayed combustion effect which steam causes when mixed directly with fuel gas, and to minimize the tendency of carbon to form when the recycle gas is heated in coil $a$. For a given unit capacity reaction chamber 1 is designed to give the optimum time of contact of the hot products of combustion with the hot gases and vapors from coils $a$ and $b$, however, final adjustment of said time of contact can be made by introducing the quenching fluid into the reaction chamber 1 at selected levels; the reasons for this are perhaps obvious. Means for introducing the quenching fluid into chamber 1 of the figures are shown at two separate levels but of course arrangements could readily be made to provide a greater degree of regulation by the use of inlet ports for the quenching fluid at a greater number of levels. When operating with petroleum naphtha as the raw material and promoting reactions favorable for the production of butadiene the time of contact of the hot gases with the naphtha vapors in reaction chamber 1 prior to quenching is approximately one-tenth of one second at the high temperature of about 1350° F.; the lower the temperature the greater the time of contact required, within the temperature range at which butadiene is formed. When the flow of gases, vapors, and air to reaction chamber 1 are adjusted and operation is under way the fine adjustment of temperature in the mixing zone of reaction chamber 1 is most advantageously obtained by adjustment of the valve in the air supply conduit to mixing chamber 21. An effective way of accomplishing this result is to employ an auxiliary supply of air to mixing chamber 21 with a thermally operated valve which opens and closes as the temperature indicated by a pyrometer, the thermocouple of which is located in the gas vapor mixing zone of reaction chamber 1, decreases or increases respectively. The mechanical details of this operation are not shown in the figures for the purpose of simplicity.

It is essential in promoting these reactions at elevated temperature that the gases and vapors introduced into reaction chamber 1 of the figures be thoroughly mixed therein before the mixture is quenched; this is accomplished by introducing the gas and vapors from coils $a$ and $b$ tangentially and causing the hot products of combustion to pass into the swirling mixing fluids. Provision is made for completing the combustion reactions in the upper portion of reaction chamber 1 before the products of combustion contact the fluids from coils $a$ and $b$. Various means may be employed for this purpose although I find that a checker-brick system is satisfactory; checker bricks are shown at 27 in Figure 2.

In the quenching operation conducted by introducing a quenching fluid into reaction chamber 1 as through valves 30, 31 and 32 of Figure 2, it is only necessary that fluid flowing through reaction chamber 1 containing the reaction products be cooled to a temperature below about 600° F. It is important that the quenching fluid be non-acid as regards mineral acids or certain acids known to promote polymerization of unsaturated hydrocarbons; phenolic acids are not of this type. It is found that the high-boiling residue from fractionator 4 of Figure 1 is a satisfactory quenching fluid particularly when it is maintained in a neutral or alkaline condition, namely when deleterious acidic components of said residue are maintained at a minimum. Under certain conditions it develops that the addition of neutralizing agents to the recirculated quenching fluid is beneficial; such neutralizing agents include ammonia, amino compounds, and certain nitrogen bases. When compounds of calcium, magnesium, sodium or similar compounds are used as acid neutralizing agents the products of neutralization as well as any excess of the neutralizing agent should be removed from the quenching fluid before said fluid is introduced into reaction chamber 1 of the figures. It is important to note that the use of the high-boiling products from fractionator 4 as quenching medium is not a requirement of this invention, other high-boiling liquid can be used as well. It is advantageous to first partially cool the hot stream by vaporizing water therein before quenching with said high-boiling liquid to avoid cracking.

In the production of butadiene as outlined in the foregoing the yield of butadiene per unit of raw material used in the process is appreciably increased when butane is introduced as one of the reactants. In processing petroleum naphtha as outlined good results are obtained, from the simultaneous use of butane, when said butane is introduced along with the recycle gas into coil $a$. The yield of butadiene, when the butane is employed in this manner, is higher than when the same amount of butane is introduced along with the naphtha vapor into coil $b$. This is important and I believe a novel feature of my invention. The butane used with the recycle gas may be from any source but can conveniently be obtained after removing the butadiene from the butadiene cut, which cut is recovered as one of the valuable products of reaction.

It is desirable in the operation of this invention to heat the gases passing through coil $a$ in furnace A of Figure 1 to as high a temperature as practicable; one is not only limited as to the temperature attainable, by the composition of the tubes employed in the construction of coil $a$, but by the properties of the gases passing through coil $a$. Cracking of the gases with the formation of carbon in coil $a$ is to be avoided or at least reduced to a minimum, which minimum should represent a very small per cent of the gas passed. Accordingly it is advantageous to use some steam with the recycle gas flowing to coil $a$. The volume of steam employed preferably should not be greater than the volume of gases passed therewith through coil a in the production of butadiene as outlined. The steam thus used reduces the tendency for carbon to form and permits the use of somewhat higher temperatures in coil a than would otherwise be found satisfactory.

Burning the fuel gas used, with insufficient air for complete combustion of said gas, produces sufficient hydrogen, which, in contact with the hot refractory 27, reduces oxides of nitrogen to water and nitrogen.

In the foregoing the description has been directed largely, by way of example, to the production of butadiene, which material is adapted for use in making rubber-like products and other materials, but it is intended that the scope of the invention be broader than this. For example, it is possible to produce, by changes in operating procedure, temperature, raw materials, and time of contact of the fluids, such materials as naphthenic acids, aldehydes, alcohols, acetylene, and particular unsaturated and aromatic hydrocarbons. Again it is possible to re-form hydrocarbon gases by reaction of said hydrocarbon gases with steam forming carbon monoxide and hydrogen. In the latter case a longer time of contact is desired than in making butadiene, hence the volume of the chamber in which the re-forming reactions occur should be larger than is required in making butadiene. Naphthenic acids are products of oxidation of hydrocarbons and their production depends upon the control of the temperature, the amount of oxygen contacting the vapors of said hydrocarbons and the time the mixture is maintained at an elevated temperature. Referring to Figure 2, in the production of the naphthenic acids it is not necessary to promote all of the combustion reactions in the top portion of reaction chamber 1 but on the contrary, it is preferable to promote some of the combustion in a lower zone; this is particularly true when the major reactant hydrocarbons are passed through reaction coils a and b shown in Figure 1. In this case it is preferable to pass more of the recycle gas through 13 and mixing chamber 21 of Figure 1 than is used in this manner in the production of butadiene and somewhat more steam can be used in coil a. Lower temperatures are employed in both coils a and b when producing the naphthenic acids than when producing butadiene. Without elaborating extensively as to the particular products that can be made by control of the numerous variables it would seem sufficient to state that the products are numerous even employing a single raw material plus the recycle gas. By varying the nature of the raw materials used a wide variety of valuable products are obtainable in employing this invention. The optimum temperature to be employed for any particular product can readily be determined by experiment. The relative sizes of the combustion chamber and the mixing zone of reaction chamber 1 of Figure 1 vary according to the products sought. For the guidance of one skilled in the art in practicing this invention it can be stated in general that (a) high temperatures in the mixing zone of reaction chamber 1 and an appreciable time of contact of the reactants in this zone favor the production of aromatic compounds; (b) high temperatures of the reactants in the said mixing zone with a very brief time of contact favor the production of unsaturated hydrocarbons; (c) employing lower temperatures in the mixing zone and an appreciable time of contact in said zone olefin hydrocarbons form with the minimum amount of diolefins; (d) the production of alcohols, glycols, aldehydes and certain other oxidation products are dependent upon arrested combustion and therefore the variables should be so adjusted that the desired amount of oxidation can occur by contacting the reactant hydrocarbon with sufficient oxygen in proper dilution at the temperature and time of contact found to be favorable.

It is possible to make styrene, indene, cyclopentadiene and other products of similar nature practicing this invention by adjusting the operating variables and supplying the proper material for processing. These named materials are produced in optimum amounts when all of the aromatic distillate is returned to the reaction chamber 1 of Figure 1, through coil b except that used for refluxing in fractionator 4, using the fresh charge naphtha as "make up" to keep the process going. They are recovered from locations in the system compatible with their boiling points and the temperature and pressure conditions prevailing.

Before defining my claims I call attention to another particular product which can be made practicing this invention, in a number of different grades accordingly as the temperatures and other operating variables are altered, namely carbon black. Most of the operations alluded to in the foregoing are carried out most advantageously by employing superatmospheric pressure in the reaction chamber 1 of the figures and this pressure is of the order of fifteen to seventy pounds gage in most cases. In the production of carbon black the operation may be varied appreciably from the above described procedure within the confines of my invention. For example, combustion of a fuel gas is promoted in the upper portion of reaction chamber 1 by introducing said fuel gas and air for its combustion through mixing chamber 21 of Figure 1. Gases, vapors, or a gas adapted to yield carbon black pyrogenetically, after being preheated in the heating coils a and b, are introduced into reaction chamber 1 and into the stream of hot products of combustion passing therethrough. Many of the advantages of maintaining high pressures do not prevail in the production of carbon black particularly when the hydrocarbon reactants are converted very largely into their elements hydrogen and carbon. In this case the hydrocarbon admitted through the said coils a and b may be expanded into reaction chamber 1 and the resultant effluent gas stream removed through offtake conduit 3 may be at lower pressure than normally prevails in the production of butadiene. The quenching fluid, making carbon, is preferably water and the fractionator 4 of Figure 1 is in this case a carbon separator such as an electric precipitator which is operated at a temperature and pressure at which water is in the vapor phase. The characteristics of carbon produced in this manner vary appreciably according to: the temperature in the reaction chamber; relative amounts of hydrocarbon, products of combustion, and recycle gas; the duration of the period of time the reactant gases are at the elevated temperature in reaction chamber 1 prior to quenching; the pressure under which the reactions are promoted in the reaction chamber 1; the amount of steam employed in the recycle gas; and according to the adjustment of other variables. Accordingly the procedure of operation for producing carbon black can best be determined by experiment, changing the operating variables and selecting the carbon best adapted for a particular use.

I find that, under certain conditions, when operating with temperatures in the hot zone or reaction zone of reaction chamber 1 of Figure 1 bordering on the upper limit for producing reaction products, the recirculation of the heavy residue from fractionator 4 as a quenching medium is not satisfactory. Under these conditions the formation and deposition of carbon occurs in the lower portion of chamber 1 and in the offtake therefrom for the stream of reaction products. When attempting to cool with water, using the heat of vaporization of water as means of absorbing the heat of the hot gaseous stream, the volume of the vapor of the evaporated water is so great that fractionator 4 must be relatively, extremely large. This difficulty, I find, can be overcome by dividing the stream of hot gaseous reaction products, cooling one portion completely, that is, to a temperature of about 150° F. by contact with water, immediately contacting the cooled gas, flowing as a stream, with the uncooled portion thereof, the division of the hot gas stream being such that the final partly cooled mixture carries sufficient heat for satisfactory operation of the fractionator 4. Actually satisfactory results are obtained when the division is in two substantially equal portions. Although this procedure is not presented in detail in the drawings, it is shown in Figure 2 that a portion of the cooled gas can be withdrawn from the lower offtake 3 by closing valve 36, partly opening valve 35, and thus causing some of the hot gaseous reaction products to be discharged from chamber 1 through offtake 37, and immediately mixed with the cooled gas from conduit 38. In this procedure valve 40 is open and the mixture of cooled and hot gases is conducted to the fractionator 4 in the usual manner.

It has long been recognized that catalysts can be effectively used in promoting chemical reactions, and the applicant finds that catalysts can also be effectively used in employing his invention. Many high temperature reactions occur substantially as well or as completely without catalysts as with them, although this is not strictly true when maintaining the reactants at high temperatures for very brief periods of time. Accordingly, it is advantageous, under certain sets of conditions, to employ suitable catalysts in the reaction zone of reaction chamber 1 of Figure 2. In other words, employing a catalyst, the operation comprises passing the hot reactant fluids into the reaction chamber 1 under conditions adapted to cause them to immediately mix with the freshly generated hot products of combustion also produced in said chamber 1 and conducting the united streams directly into a bed of contact material, which material is preferably a catalyst adapted to catalyze the reaction being promoted and quenching the said united stream immediately after contact with said catalyst in said reaction chamber 1.

For the purpose of avoiding vagueness, an example of the procedure, which, it is believed, comes strictly within the confines of this invention, is the production of butadiene from unsaturated hydrocarbons such as propylene. Referring to Figure 2 a stream of reactant fluid comprising propylene is introduced into reaction chamber 1 after first being heated in coil $a$ to a temperature below 1300° F. Combustible fluid is burned in the upper portion of reaction chamber 1 as outlined above and the hot gaseous products of combustion are mixed with the heated vapors of the propylene stream in a mixing zone adjacent the catalyst bed and the united stream at a temperature approximating 1325° to 1350° F. is immediately passed through the said catalyst bed at a rather high velocity and immediately quenched. The time that any given unit of the united stream is in contact with the catalyst bed is very brief, in fact, the propylene should not be maintained at a high temperature for more than a fraction of a second in order to obtain optimum results. The gaseous products of reaction are removed from chamber 1 in the united stream as outlined above. A suitable catalyst for promoting this reaction is copper, brass, and certain metals of group 6 of the periodic table.

A unique effect is attained when employing a catalyst in the manner outlined herein. The major portion of the heat required in the process is supplied external of the reaction chamber, namely, it is applied by heating the reactant fluids in separate furnaces while confined in pipe coils; the reactants are brought into the reaction chamber adjacent the catalyst before they are finally heated to that temperature which is optimum for catalytic reaction to occur by causing them to mix with a hotter gas just as they enter the bed of catalyst. In this manner I find it is possible to eliminate losses due to prolonged heating at elevated temperatures and to obtain the maximum yields of valuable reaction products including butadiene. In this manner a minimum amount of combustion products are required in the reaction chamber and the catalyst bed is maintained at an elevated temperature by virtue of the sensible heat of the united streams of hot gases passing therethrough. The use of metal catalysts, preferably in the form of spheres, is particularly advantageous in practicing this invention because, being good heat conductors, they help minimize local overheating and provide a more uniform temperature in the catalyst bed.

Somewhat summarily but for the purpose of clearness the major steps of the operation of this invention are briefly presented as follows: Referring to Figure 1, employing petroleum naphtha as the initial raw material, the said naphtha is treated for the removal of sulphur compounds in sulphur removing apparatus 16, after which it is introduced into the system preferably at the upper portion of absorber 8 wherein it is used as an absorber oil, ultimately reaching the vaporizer 25 through conduit 18; the vapors from vaporizer 25 preferably preheated are conducted to coil $b$ in furnace B wherein they are heated to a temperature below 1300° F. and preferably not over 1280° F., discharging from said coil $b$ into reaction chamber 1 at a temperature preferably below 1300° F. Simultaneously gaseous products from the depropanizer, which gases are substantially free from carbon dioxide, carbon monoxide, hydrogen and nitrogen, are conducted as recycle gas into coil $a$ wherein they are heated as a stream to a temperature above 1300° F., the temperature being that at which the gases can most economically be heated without destroying valuable components thereof; employing a one inch pipe as coil $a$ the temperature of the gas leaving coil $b$ can be as high as 1450° F. but with larger tubes such as a two inch tube the temperature of the heated gases leaving coil $b$ should preferably be at about 1400° F. The gas stream discharged from coil $a$ passes directly into reaction chamber 1 wherein it immediately mixes with the hot vapors discharged therein from coil $b$. Simultaneously combustible gas is introduced into the upper portion of the reaction chamber 1 and caused to burn therein with insufficient air for its complete combustion and the products of combustion are immediately discharged as a stream into the mixing gas and vapors from coils a and b. The amount of gas burned in the upper portion of reaction chamber 1 being preferably that amount only which will give to the united stream of gas and vapors, after mixing, a temperature above 1350° F., the optimum temperature varying with the product sought and the raw material employed. Employing the said petroleum naphtha as the initial raw material and making butadiene, the optimum temperature of the united stream in reaction chamber 1 appears to be within the range 1350° to 1450° F. with a time of contact prior to quenching of about one-tenth of one second, whereas with somewhat higher temperatures the time of contact, that is, the duration of time at which the united stream is retained at the high temperature prior to quenching, must be appreciably lower. One-hundredth of one second is sufficient time of contact at a temperature of the order of 1500° F. The hot gas stream containing the reaction products are immediately quenched in the said reaction chamber 1 with the suitable quenching fluid which may comprise the heavy fraction recovered from the bottom of fractionator 4. The stream containing the reaction products is conducted to fractionator 4 and on through a separatory system wherein the valuable components thereof can be removed and recovered. The products which may be recovered include, besides butadiene, in this example, benzol, toluol, xylol, butylene and other hydrocarbon compounds. Separate recovery equipment is not shown in the Figure 1 because invention is not claimed thereon, but it seems desirable to point out that aromatic compounds are produced in this system and that they are separately or collectively recoverable and that their recirculation into the system as through coil b of furnace B is not necessary to the successful operation of this invention. All of the gases and vapors introduced into reaction chamber 1 during the operation of the process are preferably admitted under superatmospheric pressure, commonly of the order of fifteen to seventy pounds gage pressure. A catalyst may be used for promoting the thermal reaction in reaction chamber 1; in many cases this is advantageous and in others it is not required; a catalyst appears to be more effective in the lower temperature range at which operations may be conducted than in the upper temperature range. The temperature of the catalyst bed 42 of Figure 2 is maintained by virtue of the sensible heat of the fluid stream flowing through it; the mean temperature of the bed is usually somewhat lower than that of the freshly mixed, hot gases in the united stream. It is understood that the use of a catalyst can be omitted as a part of the process without affecting the invention. Under certain sets of conditions, particularly when there is an appreciable amount of coke or carbon formed and deposited in the catalyst mass it is preferable to either eliminate the catalyst or use a catalyst mass which provides a less tortuous path than a poured bed of small-size solids.

Referring to Figure 1, it has been pointed out that a quenching fluid can be used, employing this invention, whereby the fluid is completely vaporized or only partly vaporized. When the complete heat of vaporization of the quench liquid is not utilized in the quenching operation and said liquid passes on in the liquid phase with the gas stream, as from reaction chamber 1 to fractionator 4, the design and arrangement of equipment should obviously be such that conduit 3 for conducting the quenched gas along with any liquid quenching fluid should preferably drain from 1 to 4 in order to prevent accumulation of liquid in 1. When quenching gases at high temperature, about 1200° F. and higher, I find it is uniquely advantageous to use water for the first stage of quenching, cooling to a degree whereby the high-boiling hydrocarbons used for the subsequent stage of cooling is not appreciably cracked in said stage. This is accomplished, referring to Figure 2, by opening valve 45 in water pipe 44, for the first stage of cooling, and opening valves 30 and 31 for the hydrocarbon used in the second stage of cooling, in which stage the gas stream is cooled from about 1000° F. to less than 600° F.

Having described my invention so that one skilled in the art can practice it employing hydrocarbons subject to thermal reaction as raw material, I claim:

1. A substantially continuous process for promoting thermal vapor phase, hydrocarbon reactions in an elongated upright reaction chamber containing solid contact material, comprising, passing at least one aeriform stream comprising a preheated hydrocarbon in the vapor phase suitable for thermal reaction, at an elevated temperature, into a reaction zone intermediate the ends of said reaction chamber, simultaneously introducing into another portion of said reaction chamber another stream comprising a mixture of a combustible fluid and oxygen in which the oxygen is somewhat less than enough for complete combustion of said combustible fluid, promoting combustion in the latter stream, causing the latter stream comprising burning fluid to pass through a porous bed of hot refractory solids in said chamber wherein combustion reactions are substantially completed, causing the stream of hot freshly generated products of combustion to mix intimately with the first named stream while at an elevated temperature in said reaction zone whereby at least one valuable reaction product is formed, immediately after a brief reaction period quenching the resultant stream to minimize polymerization, recovering from the quenched stream said valuable product and recirculating at least a portion of the other combustible reaction products substantially free from nitrogen, carbon monoxide and carbon dioxide into said reaction chamber as a part of one of said streams.

2. A substantially continuous process for promoting thermal vapor phase, hydrocarbon reactions in an elongated upright reaction chamber, comprising, passing substantially continuously a stream initially containing reactant vapor phase hydrocarbons tangentially into an intermediate reaction zone of said chamber while they are at an elevated temperature thereby causing them to mix in said zone by a whirling motion, simultaneously introducing into an upper adjacent combustion zone of said chamber substantially continuously a second stream initially comprising a mixture of combustible gas and air, initiating combustion in said second stream and passing it downwardly into a porous bed of hot contact solids confined in said chamber thereby promoting completion of combustion reactions, immediately passing the stream of hot combustion products after combustion reactions are substantially completed downwardly into the hot whirling hydrocarbon stream in said zone and causing a combined mixed stream to form in said zone having a higher temperature than the first named stream but being at least at reaction temperature, immediately passing the combined stream substantially continuously into intimate contact with refractory contact material in said reaction zone for a period of time of the order of 0.01 to 1.0 second causing reaction to occur therein forming at least one valuable reaction product in said combined stream, immediately quenching said stream sufficient to retard undue polymerization of said product and recovering said product therefrom, meanwhile maintaining said refractory contact material at substantially reaction temperature by the sensible heat of the said combined stream.

3. A substantially continuous process for promoting thermal vapor phase hydrocarbon reactions and forming valuable reaction products in an upright reaction chamber, comprising, passing substantially continuously a preheated stream initially containing a reactant vapor phase hydrocarbon tangentially into an intermediate reaction zone of said chamber, simultaneously similarly introducing into said zone substantially continuously a second preheated stream initially containing a gaseous hydrocarbon of lower molecular weight than the aforesaid hydrocarbon along with steam thereby causing the streams to mix in said zone by a whirling motion, simultaneously introducing into an adjacent upper combustion zone of said chamber substantially continuously a stream initially containing premixed combustible gas and air, initiating combustion in said stream and passing it directly into and through a porous bed of hot contact material confined in said chamber thereby promoting completion of combustion reactions between said gas and air therein, immediately passing the stream of hot combustion products from the upper combustion zone into the whirling mixing streams in the intermediate reaction zone thereby heating them to a higher temperature forming a combined stream, immediately passing the combined stream substantially continuously into contact with a porous bed of hot catalyst in said zone for a period of time of the order of 0.01 to 1.0 second causing said thermal reactions to occur in said stream substantially while in contact with said hot catalyst forming said reaction products along with a low molecular weight hydrocarbon gas, immediately quenching the latter stream in a lower zone of said chamber to retard polymerization of the reaction products, removing the quenched stream from the chamber, recovering said products from the quenched stream separate from said low molecular weight hydrocarbon and returning at least a portion of the said low molecular weight hydrocarbon substantially free from nitrogen, carbon monoxide and carbon dioxide to said reaction zone as a part of said second stream.

4. A substantially continuous process for promoting thermal vapor phase hydrocarbon reactions in an upright reaction chamber, which process comprises continuously passing a stream containing a preheated hydrocarbon vapor from an external source into a mixing zone located intermediate the ends of the chamber, continuously introducing into an upper portion of said chamber another stream comprising a mixture of a combustible fluid and oxygen, the amount of oxygen being insufficient to completely oxidize said combustible material, promoting combustion in the latter stream while passing said stream through a porous bed of hot refractory solids in said chamber until substantially all the oxygen has reacted with combustible materials, then passing said hot combustion products directly into the mixing zone and causing the two streams of hot gases to commingle therein, passing the combined stream of hot gases into a reaction zone containing solid contact material located just below the mixing zone and reacting the gases whereby at least one valuable reaction product is produced, continually passing the composite stream containing the reaction product downwardly through the chamber from the reaction zone and immediately after leaving the reaction zone quenching said composite stream by admitting a cooling fluid into direct contact with said stream, then removing the quenched stream from the chamber, recovering the valuable reaction product from the quenched stream, separating from the stream a quantity of combustible fluid substantially free from nitrogen, carbon monoxide and carbon dioxide and recirculating at least a portion of said combustible fluid free from nitrogen, carbon monoxide and carbon dioxide with the hydrocarbon vapor introduced into the reaction zone.

WILLIAM W. ODELL.